United States Patent [19]
Casey et al.

[11] 3,819,224
[45] June 25, 1974

[54] VEHICLE BODY CONSTRUCTION
[75] Inventors: William D. Casey, Farmington;
William R. Frank, Sterling Heights;
Antonino Simonte, Troy, all of Mich.
[73] Assignee: General Motors Corporation, Detroit, Mich.
[22] Filed: May 10, 1973
[21] Appl. No.: 359,015

[52] U.S. Cl. ........... 296/28 R, 188/1 C, 280/106 R, 293/63, 293/101
[51] Int. Cl. ...................... B62d 21/00, B60r 19/02
[58] Field of Search .............. 296/28 R, 28 F, 35 B; 280/106 R; 293/63, 64, 68, 99, 101, DIG. 3; 188/1 C

[56] References Cited
UNITED STATES PATENTS
| | | | |
|---|---|---|---|
| 3,146,014 | 8/1964 | Kroell | 293/DIG. 3 |
| 3,547,463 | 12/1970 | Eggert | 280/106 R |
| 3,633,934 | 1/1972 | Wilfert | 280/106 R |
| 3,663,034 | 5/1972 | Barenyi et al. | 280/106 R |
| 3,717,224 | 2/1973 | Leach et al. | 188/1 C |

*Primary Examiner*—Robert J. Spar
*Assistant Examiner*—Leslie J. Paperner
*Attorney, Agent, or Firm*—Saul Schwartz

[57] ABSTRACT

A vehicle body having a structurally rigid passenger compartment the forward portion of which is defined by a reinforced bulkhead assembly includes a first pair of supports extending longitudinally from the bulkhead assembly, a second pair of supports extending longitudinally from the bulkhead assembly and disposed below the first pair of supports, a collision bumper assembly, and a pair of polyhedral energy absorbing modules disposed between corresponding pairs of first and second supports and the bumper assembly. Each module is generally triangular in configuration and includes an outer skin adapted for accordian-like distortion with consequent energy absorbing plastic deformation in response to an impact on the bumper assembly, the modules thereby absorbing a portion of the kinetic energy of impact.

3 Claims, 6 Drawing Figures

VEHICLE BODY CONSTRUCTION

This invention relates generally to vehicle body constructions and more particularly to a construction wherein a portion of the body structure of the vehicle is adapted for energy absorbing collapse under impact loading.

The primary feature of this invention is that it provides an improved vehicle body construction wherein a portion of the body structure is adapted for energy absorbing collapse under impact loading. Another feature of this invention resides in the provision in the improved construction of a pair of polyhedral energy absorbing modules disposed between a portion of the body structure and a collision bumper assembly, the modules functioning to support the bumper assembly on the body and being collapsible in one or more energy absorbing stages under impact to absorb a portion of the kinetic energy of the impact. Yet another feature of this invention resides in the provision in the improved construction of triangularly shaped polyhedral energy absorbing modules including plastically deformable skin portions and intermediate reinforcing portions, the skin portions functioning to define the shape of the modules and being collapsible in accordian-like fashion under impact with consequent energy absorbing plastic deformation. A further feature of this invention resides in the provision in the improved construction of an end cap for each module, the end cap being fabricated of material adapted for plastic deformation at a force level lower than that necessary to initiate plastic deformation of the module skin portion so that energy absorption takes place in two stages. A still further feature of this invention resides in the provision in the improved construction of an intermediate reinforcement within each module, the intermediate reinforcement being adapted to collapse after the end cap and after collapse of the skin portion has begun thereby to effect a third stage or level of energy absorption.

These and other features of this invention will be readily apparent from the following specification and from the drawings wherein.

Figure 1:
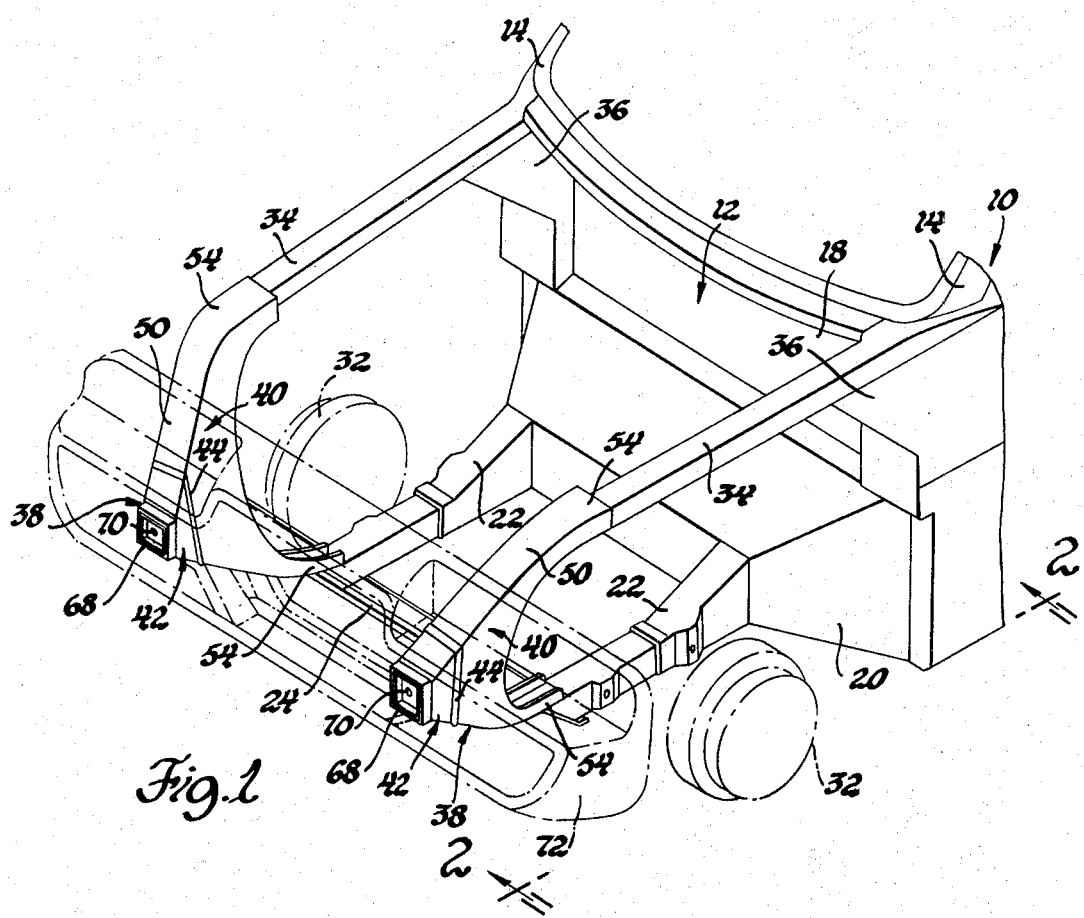
FIG. 1 is a fragmentary perspective view of the forward portion of an automobile type vehicle body constructed according to this invention.
Figure 2:
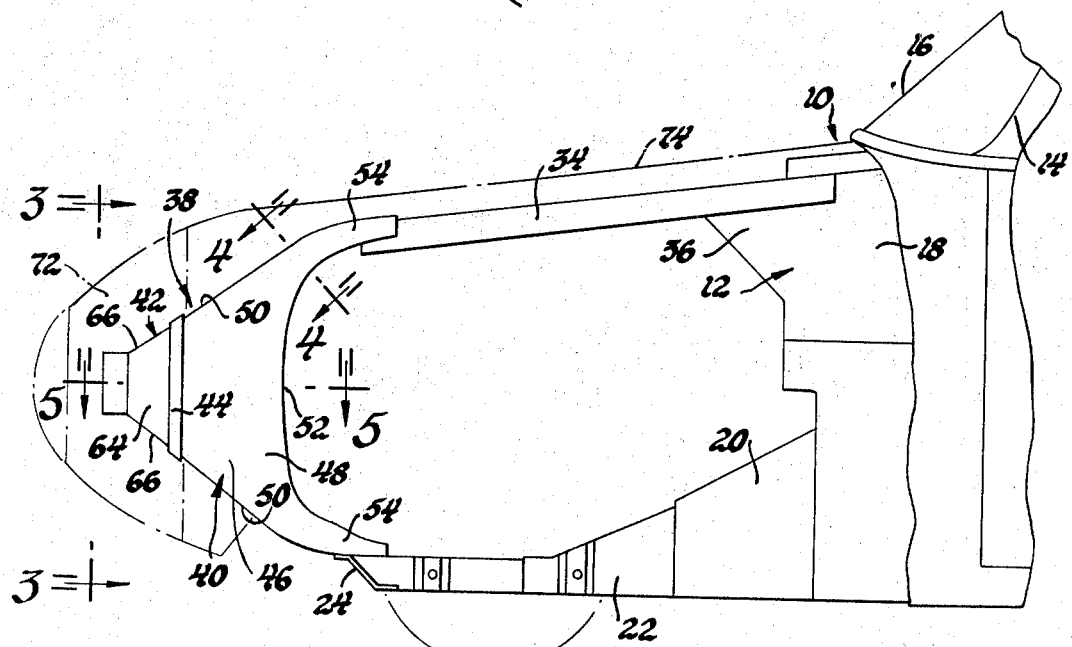
FIG. 2 is an enlarged view taken generally along the plane indicated by lines 2—2 in FIG. 1.

Referring now to the drawings, FIGS. 1 and 2 depict the forward section of an automobile type vehicle body constructed according to this invention and designated generally 10, the body 10 including a bulkhead assembly 12 defining the forward extremity of the interior or passenger compartment of the body. The bulkhead assembly 12 has rigidly extending therefrom a pair of front roof support pillars 14 which cooperate with the bulkhead assembly in defining a frame for a front windshield 16. Below the windshield 16 the bulkhead assembly includes a rigid, reinforced cowl portion 18 and a similarly reinforced lower support portion 20. Extending longitudinally of the body 10 from the lower support portion 20 and in parallel laterally spaced relationship are a pair of support arms 22 interconnected at their forward ends by a laterally extending brace 24.

The support arms 22 are rigid with respect to the bulkhead assembly 12 and function in a conventional manner as supports for the vehicle's engine and power transmission, not shown. The support arms 22 are disposed inboard of the outer lateral extremities of the body 10 to provide clearance for a pair of wheel hub assemblies 32 on which are supported conventional pneumatic tires, not shown. The wheel hub assemblies are connected to the body 10 through conventional control arm assemblies, not shown, for generally vertical jounce and rebound deflection and typical coil springs, also not shown, are interposed between one or the other of the control arms at each wheel hub assembly and the body 10 for effecting primary suspension of the body relative to wheel hub assemblies.

Referring again to FIGS. 1 and 2, a pair of longitudinal braces 34 are rigidly attached to the cowl portion 18 of the bulkhead assembly 12 and reinforced by a pair of triangular gussets 36 on opposite sides of the cowl portion, the braces being disposed outboard of the corresponding ones of the support arms 22. The braces 34 extend forwardly and in generally parallel relationship from the bulkhead assembly and are rigidly connected at their forward ends with the forward ends of corresponding ones of the support arms 22 by respective ones of a pair of polyhedral energy absorbing modules 38.

As seen best in FIGS. 1 and 3 through 6, the modules 38 are identical in construction and disposed in respective ones of a pair of longitudinally extending planes which intersect below the body 10, each plane containing the brace 34 and the support arm 22 on the corresponding side of the body. Each polyhedral module 38, FIGS. 3 and 6, is a combination of two smaller polyhedrons, one of the smaller polyhedrons being a body portion 40 and the other of the smaller polyhedrons being a cap 42 rigidly attached to the body portion 40 at a seam 44.

The body portion 40 includes an outer skin 46 fabricated to define a polyhedron having a pair of opposite sides 48 and a pair of converging ends 50, the polyhedrons thus defined being truncated at the seam 44 and defining a rhomboid in vertical transverse cross section. The ends 50 extend beyond the base of the body portion as defined by an edge 52 of each side 40 to form a pair of attaching flanges 54. An intermediate reinforcement 56 is disposed between the sides 40 and includes a pair of flanges 58 which are captured between the sides 48 and a similar pair of flanges 60 on a web 62, the web 62 also being disposed between the sides 48 of the body portion and adjacent the base. The flanges 58 and 60 are rigidly attached to the sides 48 of the body portion, as by welding, thereby to reinforce the sides against the tendency to bow outwardly under longitudinal compression loading as described hereinafter.

The outer skin 46 is adapted for plastic deformation or cold flow. For this reason, and for reasons of easy fabricability, the outer skin 46 is preferably constructed of conventional sheet metal which, under sufficient compression loading, will plastically deform in bends and folds. The particular polyhedral configuration of the body portion 40 shown in the drawings has been found to constrain the sides 48 and ends 50 for folding in accordian-like fashion when a compression load is applied perpendicular to the plane of the seam 44 and resisted at the flanges 54. Further, it has been found that the particular polyhedral configuration described presents a substantially constant resistance during deformation of the sides 48 and the ends 50 which, as will be more clearly seen hereinafter, is particularly advantageous.

Figure 3:
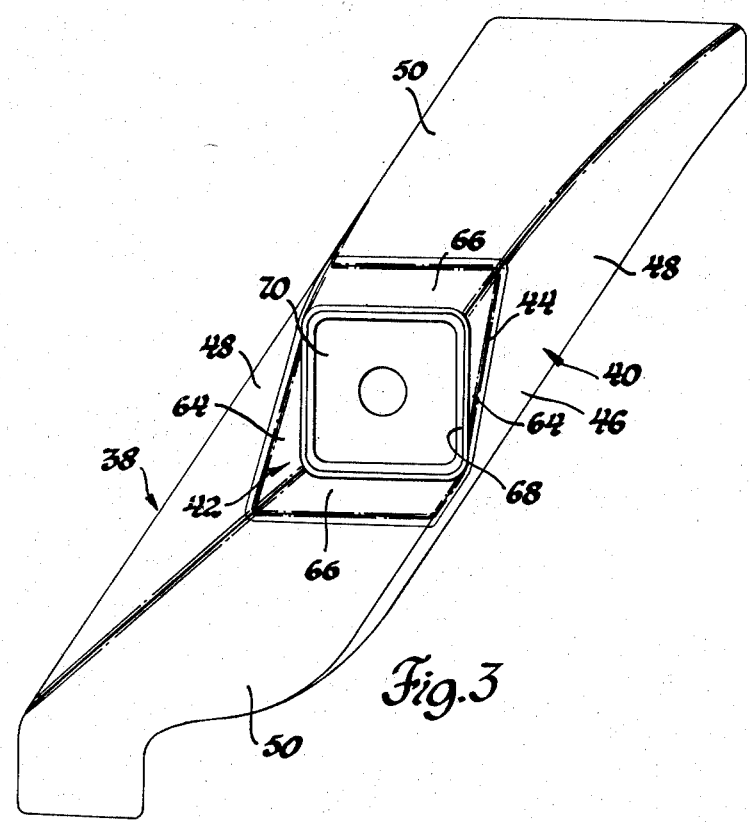
FIG. 3 is an enlarged view taken generally along the plane indicated by lines 3—3 in FIG. 2.
Figure 4:
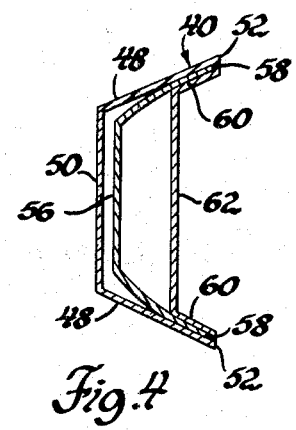
FIG. 4 is an enlarged sectional view taken generally along the plane indicated by lines 4—4 in FIG. 2.
Figure 6:
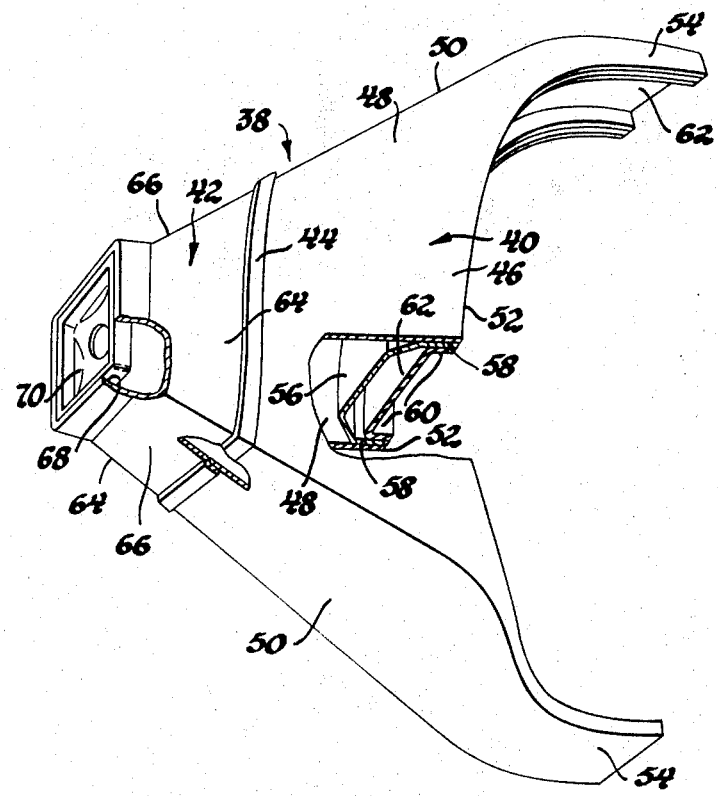
FIG. 6 is a partially broken-away perspective view of a polyhedral energy absorbing module constructed according to this invention.
Figure 5:
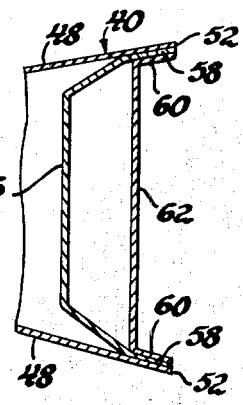
FIG. 5 is a fragmentary, enlarged sectional view taken generally along the plane indicated by lines 5—5 in FIG. 2.

Referring now to FIGS. 2, 3 and 6, the cap 42, which is the second of the small polyhedrons making up the module 38, is generally similar in configuration to the body portion 40. More particularly, the cap 42 includes an outer skin portion defining a pair of opposite sides 64 and a pair of opposite ends 66, the sides 64 and ends 66 of the cap being contiguous with the sides 48 and ends 50 of the body portion when the cap is attached to the body portion. The sides and ends of the cap terminate at a square aperture 68 in which is received a plate 70, the plate being welded or similarly rigidly attached to the cap.

The sides 64 and ends 66 of the cap are integral and, like the outer skin 46, are constructed of a material adapted for cold flow or plastic deformation, the material preferably being conventional sheet metal or the like. Since the cap is a polyhedron similar to the body portion 40, the sides 64 and ends 66 are adapted for accordian-like plastic deformation under compressive loading. Further, for reasons hereinafter appearing, the sides 64 and ends 66 are preferably adapted for deformation at a force level below that necessary to initiate similar deformation of the sides 48 and ends 50 of the body portion. To this end, the material from which the sides and ends of the cap are constructed is predeterminedly softer than the material of the outer skin 46 or, alternatively, the cap material is thinner than the outer skin 46 and, therefore, less resistant to deformation.

In combination, then, the cap 42 and body portion 40 cooperate in providing a polyhedron having, in side view, a generally triangular configuration, the apex of the triangle being at the plate 70 and the base being defined by the edges 42 of the skin portion 46. As seen best in FIGS. 1 and 2, the upper attaching flange 54 on each of the modules 38 is rigidly connected by conventional means, not shown, to a corresponding one of the longitudinal braces 34. Similarly, the lower attaching flange 54 on each module 38 is rigidly connected to a corresponding one of the support arms 22 so that the braces 34, the modules 38, the support arms 22, and the transverse brace 24 define a rigid structural unit disposed forwardly of the bulkhead assembly 12. A front collision bumper assembly 72 is adapted for attachment to the plate 70 on each of the modules 38, the attachment being either rigid or through conventional springs or hydropneumatic type energy absorbing units which are mounted on the modules and which permit limited displacement of the bumper assembly. Further, conventional sheet metal fender assemblies, such as indicated at 74, in FIG. 2, may be supported on the structural unit between the bumper assembly and the bulkhead assembly 12.

In operation, a mild or light impact on the bumper assembly sufficient to displace the latter but not sufficient to exceed the capacity of the bumper mounts, not shown, is rigidly resisted by the modules 38. A more substantial impact, one of sufficient magnitude to exceed the capacity of the bumper mounts, initiates plastic deformation of the sides 64 and ends 66 of the cap 42. Such deformation, of course, effects energy absorption as it occurs so that a portion of the kinetic energy of impact is thereby dissipated. If the impact is of only intermediate severity, the deformation of the cap 42 will be sufficient to dissipate or absorb the kinetic energy of impact so that after the impact only the cap 42 need be replaced.

If, however, a more severe impact occurs, the cap 42 experiences maximum deformation to a configuration, not shown, wherein the plate 70 is displaced back to the seam 44. Thereafter or sequentially with respect to deformation of the cap, accordian-like energy absorbing plastic deformation of the outer skin 46 commences. Because, as recited hereinbefore, the skin 46 is stronger than the sides 64 and ends 66 of the cap 42, the force resisting displacement of the bumper assembly increases so that energy is absorbed at a higher level by the outer skin 46. Further, as noted hereinbefore, each module provides a generally constant resistance during deformation so that energy is absorbed in the most efficient manner; that is, in a square wave pattern wherein the resisting force rapidly builds to a maximum and then remains substantially constant throughout the duration of deformation. When each module 38 has collapsed to the point where interference is effected between the intermediate reinforcement 56 and the plate 70, still more energy is absorbed as the intermediate reinforcement, which is also constructed of plastically deformable material such as sheet metal, undergoes energy absorbing plastic deformation. The web 62, throughout the duration of energy absorbing deformation of the module, functions to prevent outward bowing of the sides of the module so that the configuration of the base of the module remains generally intact.

Having thus described the invention, what is claimed is:

1. In a vehicle body including a structurally rigid passenger compartment portion, a first support extending longitudinally of said body from said passenger compartment portion, and a second support extending longitudinally of said body from said passenger compartment portion in vertically spaced relationship relative to said first support, the combination comprising, a polyhedral energy absorbing module including a pair of opposite sides defining generally a triangle having a base and an apex, said module including an outer skin portion fabricated of plastically deformable material and a web rigidly attached to said outer skin portion generally at the base of said triangle, means rigidly attaching said module adjacent one end of the base of said triangle to said first support, means rigidly attaching said module adjacent the other end of the base of said triangle to said second support, a collision bumper assembly, and means attaching said bumper assembly to said module adjacent the apex of said triangle, said skin portion of said module being adapted for distortion in generally accordian-like fashion with consequent plastic deformation in response to an impact force on said bumper assembly thereby to absorb a portion of the kinetic energy of impact.

2. In a vehicle body including a structurally rigid passenger compartment portion, a first support extending longitudinally of said body from said passenger compartment portion, and a second support extending longitudinally of said body from said passenger compartment portion in vertically spaced relationship relative to said first support, the combination comprising, a first polyhedron having an outer skin portion fabricated of plastically deformable material, a second polyhedron having an outer skin portion fabricated of plastically deformable material adapted for deformation at a force level exceeding that necessary to effect plastic deformation of said first polyhedron skin portion, means rigidly attaching said first and said second polyhedron, said first and said second polyhedrons cooperating in defining a polyhedral energy absorbing module including a pair of opposite sides defining generally a triangle having a base and an apex, a web rigidly attached to said module generally at the base of said triangle, means rigidly attaching said module adjacent one end of the base of said triangle to said first support, means rigidly attaching said module adjacent the other end of the base of said triangle to said second support, a collision bumper assembly, and means attaching said bumper assembly to said module adjacent the apex of said triangle, said first and said second polyhedron skin portions being adapted for sequential distortion in generally accordian-like fashion with consequent plastic deformation in response to an impact on said bumper assembly thereby to absorb a portion of the kinetic energy of impact in two distinct stages corresponding to plastic deformation of said first polyhedron skin portion followed by plastic deformation of said second polyhedron skin portion.

3. The combination recited in claim 2 further including an intermediate reinforcement disposed between said sides of said polyhedral energy absorbing module and rigidly attached thereto, said intermediate reinforcement being constructed of plastically deformable material and adapted for energy absorbing plastic deformation concurrently with plastic deformation of said second polyhedron skin portion but commencing only after a predetermined amount of distortion of said second polyhedron skin portion has occurred thereby to effect a third distinct stage of energy absorption.

* * * * *